(12) United States Patent
Hirosawa

(10) Patent No.: US 6,301,429 B1
(45) Date of Patent: Oct. 9, 2001

(54) REPRODUCING APPARATUS, RECORDING APPARATUS AND RECORDING MEDIUM ADAPTED TO PROCESS FADE-IN, FADE-OUT AND CROSS-FADE

(75) Inventor: Koji Hirosawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/073,681

(22) Filed: May 6, 1998

(30) Foreign Application Priority Data

May 19, 1997 (JP) .................................................... 9-128582

(51) Int. Cl.[7] .............................. H04N 5/76; G11B 27/02
(52) U.S. Cl. ................................ 386/53; 386/95; 360/13; 369/83
(58) Field of Search .................................... 386/46, 4, 39, 386/52–64, 9, 93, 95, 96; 360/13, 27; 369/83; H04N 5/26, 5/92, 9/79

(56) References Cited

U.S. PATENT DOCUMENTS

| 4,992,891 | 2/1991 | Komatsu et al. . |
| 5,166,835 | * 11/1992 | Tanizawa ................................ 360/13 |
| 5,625,461 | 4/1997 | Okamoto et al. . |

* cited by examiner

*Primary Examiner*—Thai Tran
(74) *Attorney, Agent, or Firm*—Frommer Lawrence & Haug LLP.; William S. Frommer; Samuel H. Megerditchian

(57) ABSTRACT

An optical pickup reads a video signal and fade information on "start time" and "speed", recorded in an optical disc or the like and supplies them to a demultiplexer through a data reproduction circuit. The fade information is supplied to a controller via a fade information extraction circuit. The controller controls cross-fade processing in a cross-fader based on the fade information. An existing video signal or audio signal in the recording medium can be used to repeatedly process the signal for fade-in, fade-out or cross-fade.

12 Claims, 4 Drawing Sheets

REPRODUCING APPARATUS, RECORDING APPARATUS AND RECORDING MEDIUM ADAPTED TO PROCESS FADE-IN, FADE-OUT AND CROSS-FADE

BACKGROUND OF THE INVENTION

1. Field of the Invention

The present invention relates to a reproducing apparatus suitably usable in various types of video and audio players, video recorders, etc., and more particularly to a reproducing apparatus adapted to process an image for fade-in and -out, etc.

2. Description of Related Art

In motion pictures, TV programs, etc., imaging techniques such as fade-in or -out of video and audio signals are often used when a person appears in or leaves a scene. Also, when a scene is changed to another, a video signal is very often processed for cross-fade.

Explanation will be made of an image or video signal, for example, the "fade-in" is a technique or signal processing by which an image not visible is made to appear little by little, and the "fade-out" is a technique by which a currently visible image is made to gradually disappear. Image fade-in can be attained by raising the level of a video signal gradually up to a predetermined level, while fade-out can be attained by gradually lowering the video signal level and finally down to zero.

Further, the "cross-fade" is a technique by which a currently visible image is made to gradually disappear while another image is composed little by little and finally only this composed image is displayed. For example, one video signal is gradually lowered in level while another video signal is raised in level little by little and finally the latter video signal is delivered as an output.

Recording media such as cassette tapes, discs, etc. have recorded therein video and audio signals edited for fade-in, fade-out or cross-fade. When it is necessary to re-edit the video and audio signals recorded as so edited in such medium, it is not possible to restore the video signal once edited for fade-in or the like, etc. to its original state, which is very convenient. In other words, for re-edition of a video signal or the like in a recording medium to change a position at which the signal is to be processed for fade-in or otherwise, an edited video signal has to be written over an existing video signal or the like in a recording medium since the existing signal cannot be used. This is very disadvantageous in trying to edit the video signal many times.

SUMMARY OF THE INVENTION

The present invention has an object to overcome the above-mentioned drawbacks of the prior art by providing a recording apparatus, recording apparatus and recording medium in which an existing video signal or audio signal in the recording medium can be used to repeatedly process the signal by fade-in, fade-out or cross-fade.

The above object can be accomplished by providing a reproducing apparatus comprising, according to the present invention, a reproducing means for reproducing a video signal and a fade information indicative of a change in output level of the video signal, recorded in a recording medium, and an output adjusting means for adjusting the output level based on the fade information and then delivering the video signal from the reproducing means.

Therefore, to provide a video signal having not been specially processed, the reproducing means will deliver an image having been processed for fade-in based on the fade information.

The above object can also be accomplished by providing a recording apparatus comprising, according to the present invention, a controlling means for setting a fade information indicative of a change in output level of a video signal, a fade information generating means for producing the fade information based on the setting made by the controlling means, and a recording means for recording the produced fade information and the video signal into a recording medium.

Therefore, since the recording apparatus records a fade information to provide an image having been processed for a fade, it will record a normal video signal without recording into the recording medium a video signal having been processed for the fade.

Also the above object can be accomplished by providing a recording medium having recorded therein a video signal and a fade information indicative of a change in output level of the video signal.

Therefore, since the recording medium has recorded therein a fade information to provide an image having been processed for a fade, it will record a normal video signal without recording into it a video signal having been processed for the fade.

The reproducing apparatus of the present invention comprises a reproducing means for reproducing an audio signal and a fade information indicative of a change in output level of the audio signal, recorded in a recording medium and an output adjusting means for adjusting the output level based on the fade information and then delivering the audio signal supplied from the reproducing means.

Therefore, to provide an audio signal having not been specially processed, the reproducing means will deliver a sound having been processed for fade-in based on the fade information.

The recording apparatus of the present invention comprises a controlling means for setting a fade information indicative of a change in output level of an audio signal, a fade information generating means for producing the fade information based on the setting made by the controlling means, and a recording means for recording the produced fade information and the audio signal into a recording medium.

Therefore, since the recording apparatus records a fade information to provide a sound having been processed for a fade, it will record a normal audio signal without recording into the recording medium an audio signal having been processed for the fade.

Also the recording medium of the present invention has recorded therein an audio signal and a fade information indicative of a change in output level of the audio signal.

Therefore, since the recording medium has recorded therein a fade information to provide a sound having been processed for a fade, it will record a normal audio signal without recording into it an audio signal having been processed for the fade.

As having been described in the foregoing, the reproducing apparatus according to the present invention can reproduce a video signal recorded in a recording medium and a fade information indicative of a change in output level of the video signal and adjust the output level of the video signal based on the fade information to process the video signal even if is has not been processed for a fade.

The recording apparatus according to the present invention can record a video signal along with a fade information indicative of a change in output level of the video signal into a recording medium to process the video signal even if it has not been processed for a fade.

Also for changing the fade position to another, only the fade information has to be rewritten without any special processing of the video signal.

The recording medium according to the present invention can record a video signal and a fade information indicative of a change in output level of the video signal to process the video signal based on the fade information.

The reproducing apparatus of the present invention can reproduce an audio signal recorded in a recording medium and a fade information indicative of a change in output level of the audio signal and adjust the output level of the audio signal based on the fade information to process the audio signal even if is has not been processed for a fade.

The recording apparatus according to the present invention can record an audio signal along with a fade information indicative of a change in output level of the audio signal into a recording medium to process the audio signal even if it has not been processed for a fade.

The recording medium according to the present invention can record an audio signal and a fade information indicative of a change in output level of the audio signal to process the audio signal based on the fade information

BRIEF DESCRIPTION OF THE DRAWINGS

These objects and other objects, features and advantages of the present intention will become more apparent from the following detailed description of the preferred embodiments of the present invention when taken in conjunction with the accompanying drawings, of which.

DETAILED DESCRIPTION OF THE PREFERRED EMBODIMENTS

Figure 1:
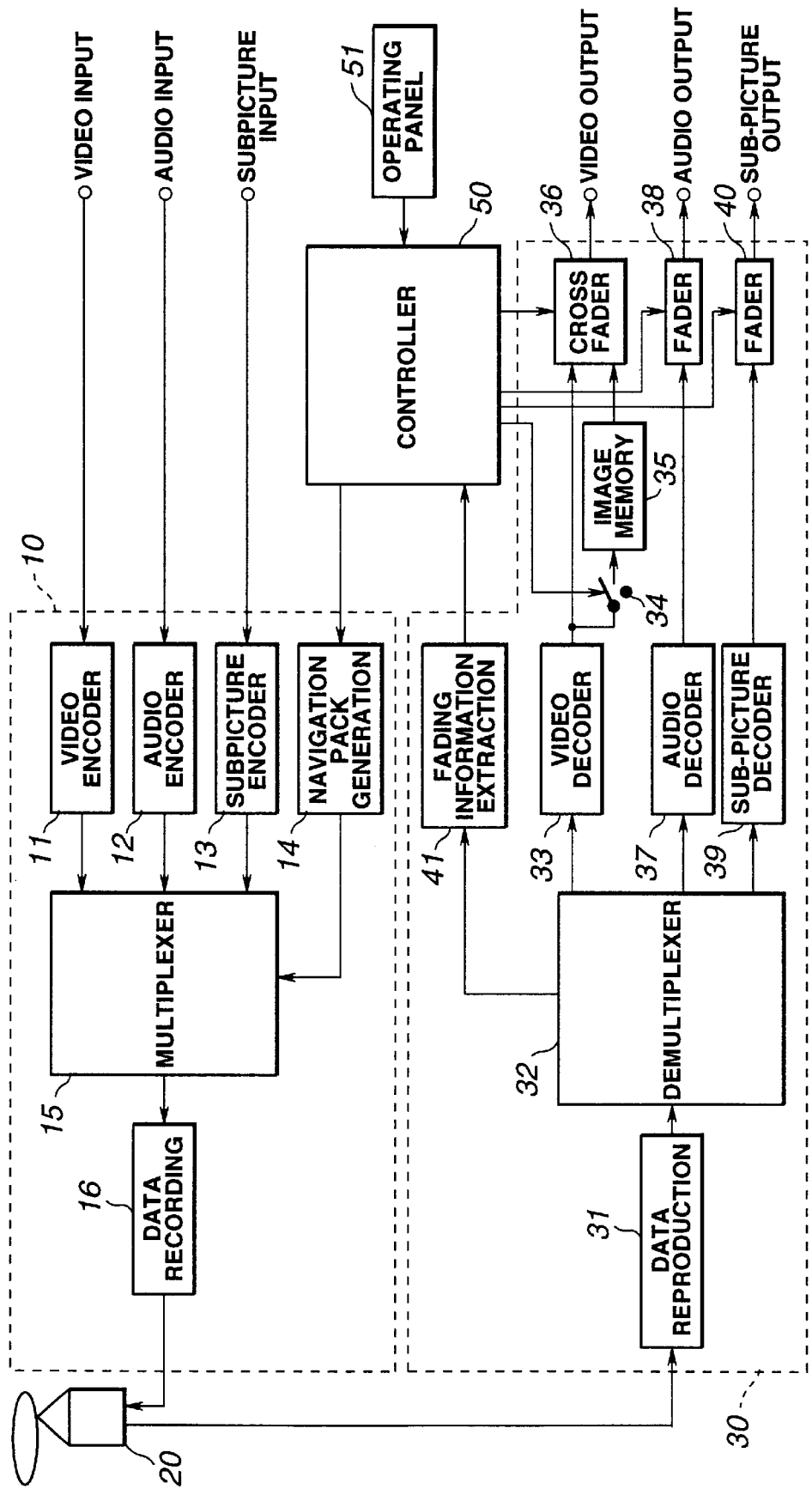
FIG. 1 is a block diagram showing the configuration of a recording/reproducing apparatus to which the present invention is applied.

FIG. 1 shows a recording/reproducing apparatus to which the present invention is applied.

The apparatus is generally indicated with a reference 1. It is adapted to process a main picture for cross-fade, for example. As seen, the apparatus 1 comprises a video signal recording unit 10, an optical pickup 20 for recording a video signal into a disc n accordance with a recording mode in the recording unit 10, a reproducing unit 30 for reproducing the video signal read from the optical pickup 20, and a controller 50 for controlling the recorder 10 and reproducing unit 30.

The recording unit 10 comprises a video encoder 11 to encode a video signal, an audio encoder 12 to encode an audio signal, a sub-picture encoder 13 to encode an video signal of a sub-picture, a navigation pack generating circuit 14 to produce a fade information, a multiplexer 15 for multiplexing the video signal, etc. and a data recording circuit 16 to control the laser power of the optical pickup 20 depending upon data to be recorded.

The video encoder 11 encodes video signals of images A, B, . . . supplied at a video input terminal to deliver the encoded video signals to the multiplexer 15. It should be noted that the video signals from the video input terminal are for a main picture for display on the full screen.

The audio encoder 12 encodes an audio signal supplied at an audio input terminal to deliver an encoded audio signal to the multiplexer 15.

The sub-picture encoder 13 encodes a video signal supplied via a sub-picture input terminal to deliver an encoded video signal to the multiplexer 15. It should be noted that the video signal from the sub-picture input terminal is for a caption, for example.

The navigation pack generating circuit 14 generates a navigation pack including a fade information under the control of the controller 50 to deliver the navigation pack to the multiplexer 15. That is to say, the controller 50 controls the navigation pack generating circuit 14 to generate a navigation pack including a fade information containing a cross-fade setting, if any, made at an operating panel 51. Information which can be set at the operating panel 51 include, for example, an information on which is to be processed for cross-fade, main picture, audio signal or sub-picture, a cross-fade processing start time, a cross-fade processing speed, etc.

The multiplexer 15 multiplexes a video signal, audio signal and navigation pack to generate a data stream for delivery to the data recording circuit 16.

Figure 2:
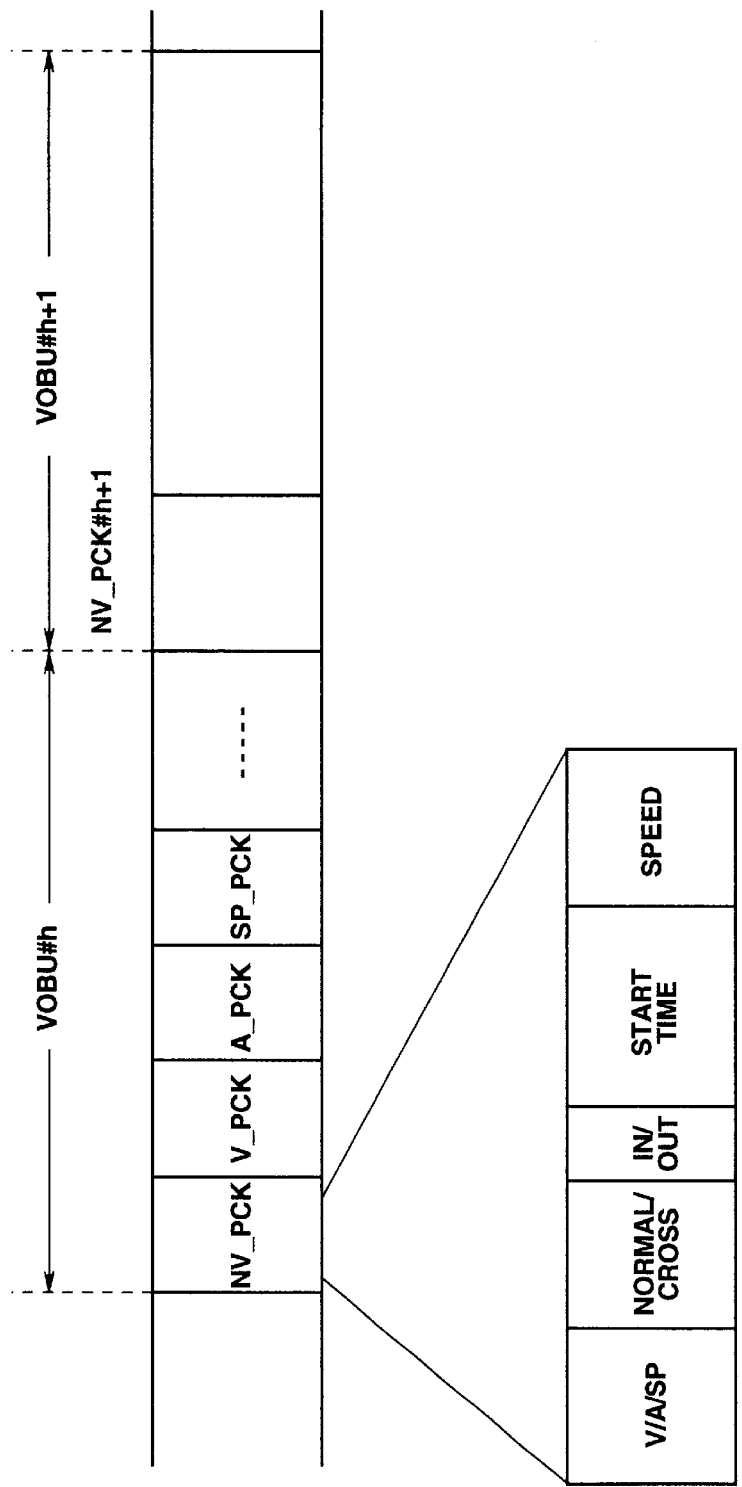
FIGS. 2A and 2B show data streams recorded into a recording medium by the recording/reproducing apparatus shown in FIG. 1.

As shown in FIG. 2A, the data stream can be composed of VOBU (Video Object Unit) including VOBU #1, . . . , VOBU #n, VOBU #n+1, . . . Each VOBU consists of a navigation pack (NV_PCK: Navigation Pack), video pack ($V_{13}$ PCK: Video Pack) derived from compression of a main picture, audio pack (A_PCK: Audio Pack) from compression of an audio signal, and a sub-picture pack (SP_PCK: Sub-picture Pack) from compression of a sub-picture video signal.

The NV_PCK includes information for controlling V_PCK, A_PCK and SP_PCK and also the above-mentioned fade information.

As shown in FIG. 2B, a fade information contains 2 bits of "V/A/SP" indicative of which is to be processed, video (main picture), audio or sub-picture, 2 bits of "NORMAL/ CROSS" indicative of which is to be done, a normal fade information (fade-in or fade-out), cross-fade processing or no processing, 1 bit of "IN/OUT" indicative of which is to be done for a normal fade, fade-in or fade-out, "START TIME" indicative of a time when a cross-fade processing is to be started, and "SPEED" indicative of a cross-fade processing speed.

In "V/A/SP", for example, "00" indicates processing of video signal, "01" indicates processing of audio signal, and "10" indicates processing of sub-picture signal. In "NORMAL/CROSS", "00" indicates nothing to be done, "01" indicates normal fade processing, "10" indicates cross-fade processing. In "IN/OUT", "0" indicates fade-in and "1" indicates fade-out.

The multiplexer 15 supplies a data stream of the above-mentioned configuration to the optical pickup 20 via the data recording circuit 16. The optical pickup 20 will write the data stream into an optical disc under the laser power control by the data recording circuit 16.

The reproducing unit 30 comprises a data reproduction circuit 31 to reproduce a signal read by the optical pickup 20, a demultiplexer 32 to divide the reproduced data stream into the respective data, a video decoder 33 to decode a video signal of a main picture, an image memory 35 to store the video signal from the video decoder 33 via a switch 34, a cross-fader 36 to process the video signal for cross-fade, an audio decoder 37 to decode an audio signal, a fader 38 to process the audio signal for a fade, a sub-picture decoder 39 to decode a video signal of a sub-picture, a fader 40 to process the sub-picture video signal for a fade, and a fade information extraction circuit 41 to extract a fade information from the divided data.

The data reproduction circuit 3 1 reproduces a signal read by the optical pickup 20 into a data stream for delivery to the demultiplexer 32. The demultiplexer 32 divides the data stream into NV_PCK, V_PCK, A_PCK and SP_PCK in each VOBU. NV_PCK is supplied to the fade information extraction circuit 41, V_PCK is to the video decoder 33, A_PCK is to the audio decoder 37, and SP_PCK is to the sub-picture decoder 39.

The video decoder 33 decodes V_PCK to generate and supply a video signal of a main picture to the image memory 35 and cross-fader 36. The image memory 35 receives and stores a video signal from the video decoder 33 via the switch 34. Note that the switch 34 is turned on and off under the control of the controller 50. A video data read from the image memory 35 is supplied to the cross-fader 36.

Figure 3:
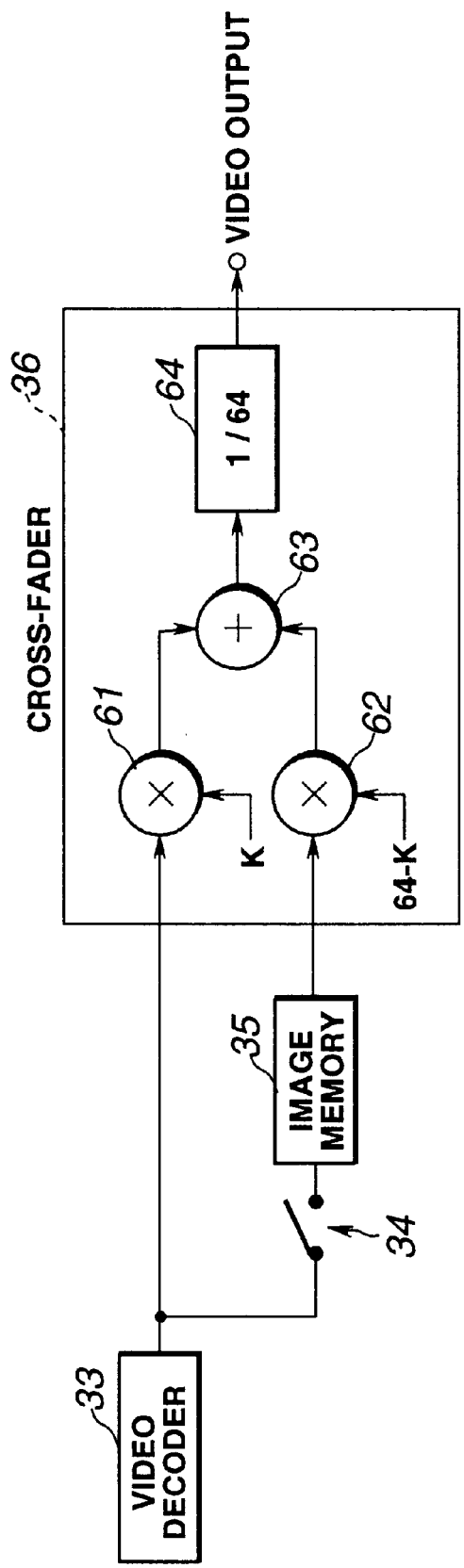
FIG. 3 is a block diagram showing in detail the configuration of the cross-fader in the recording/reproducing apparatus shown in FIG. 1.

As shown in FIG. 3, the cross-fader 36 comprises a multiplier 61 to multiply a video signal by a factor K of image composition (K=0~64), a multiplier 62 to multiply the video signal by a factor (64–K), an adder 63 to add together video signals from the multipliers 61 and 62, and a divider 64 to divide a video signal by "64".

The multiplier 61 multiplies a video signal supplied from the video encoder 33 by the composition factor K and supplies the video signal to the adder 63. The value of the composition factor K is determined by the controller 50. The multiplier 62 multiplies a video signal supplied from the image memory 35 by the factor (64–K) and supplies the video signal to the adder 63. Note that the factor K has a same value as the factor K for the multiplier 61.

The adder 63 adds together video signals received from the multipliers 61 and 62, respectively and supplies a composed video signal to the divider 64. The divider 64 divides the composed video signal by "64" and delivers it at the video output terminal.

The audio decoder 37 decodes A_PCK from the demultiplexer 32 to generate and supply its original audio signal to the fader 38. The fader 38 will process the received audio signal for fade-in or -out under the control of the controller 50, for delivery at the audio output terminal. It should be noted that the fade-in processing will further be discussed later.

The sub-picture decoder 39 decodes SP_PCK from the demultiplexer 32 to generate its original audio signal for delivery to the fader 40. The fader 40 will process the received video signal of the sub-picture for fade-in or -out under the control of the controller 50 and deliver it at the sub-picture output terminal.

The fade information extraction circuit 41 extracts the fade information from NV_PCK for delivery to the controller 50.

The controller 50 normally controls the cross-fader 36 to set the value of the composition factor K to "64" when no cross-fade processing is to be done. When supplied with the fade information (START TIME, SPEED, etc.) from the fade information extraction circuit 41, the controller 50 will set the value of the composition factor K to 0 when the fade processing start time is reached, and control the cross-fader 36 to gradually increase the value of the composition factor K correspondingly to "SPEED" again to "64".

Figure 4:
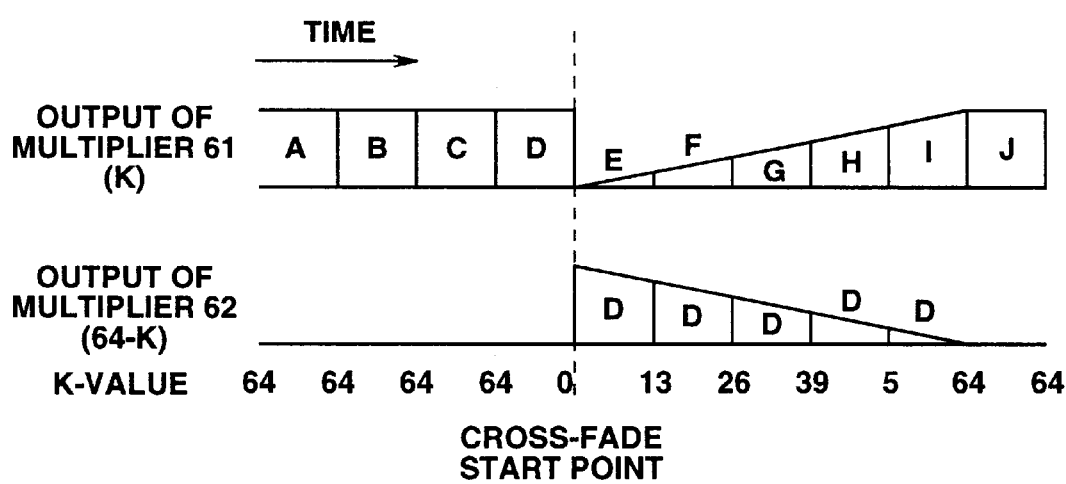
FIG. 4 is a timing chart for explaining a video signal delivered from the cross-fader.

Also the controller 50 will turn on the switch 34 when the value of the composition factor K is "64", that is to say, when no cross-fade processing is being done. On the contrary, when a cross-fade processing is being done, the controller 50 will turn off the switch 34. Thus, when no cross-fade processing is being done, fresh video signals will always be written into the image memory 35. In the course of a cross-fade processing being done, a video signal just before start of cross-fade processing is stored in the image memory 35. As shown in FIG. 4, when a cross-fade processing is started with an image E, for example, the image memory 35 stores an video signal of an image D.

Therefore, before cross-fade processing is done, the multiplier 61 will multiply a video signal from the video encoder 33 by "63" as shown in FIG. 4 and deliver the products such as images A, B, C and D, for example. The multiplier 62 multiplies a video signal from the image memory 35 by "0", so it cannot provide the images A, B and C.

When a cross-fade processing is started with the image E, the multiplier 61 will set the value of the composition factor K to "0" and gradually increase the value of the composition factor K from "0" up to 64 again. That is to say, the video output is gradually increased in the order of the images E, F, G, . . . It should be noted that the changing rate (gradient) of the composition factor K depends upon the information "SPEED". On the contrary, the multiplier 62 will set the value of the factor (64–K) by which a video signal is multiplied to "64" and the factor (64–K) will be gradually decreased from "64" to "0". Namely, the video output will gradually be decreased in the order of the images E, F, G, . . . A video signal is composed of these video signals in the adder 63 and the composed video signal is divided by the divider 64.

Therefore, before a cross-fade processing is done, the divider 64 will deliver the images A, B, C and D in full size (100%) as they are. When a cross-fade processing is started, the image D of which the output is gradually decreased will be composed for delivery together with the images E, F, G, . . . of which the output is gradually increased, will be composed for delivery. Upon completion of the cross-fade processing, a normal image is delivered through the multiplier 61, adder 63 and divider 64. Note that at this time the switch 34 is turned on and a video signal from the video encoder 33 is written into the image memory 35.

As having been described in the foregoing, the recording/reproducing apparatus can record normal images such as the images A, B, . . . and also "START TIME", "SPEED", etc. included in the fade information with which the video signals are processed for cross-fade. That is to say, a special processing of an video signal can be omitted for cross-fade processing, thus labor for such a procedure can be saved. Furthermore, reading the fade information at the time of signal reproduction, the recording/reproducing apparatus can process, for cross-fade, video signals having not been specially processed, and deliver them. It should be noted that since the recording/reproducing apparatus does not specially process a video signal itself, it can also deliver the video signal as it is by disregarding the fade information extracted by the fade information extraction circuit 41.

Further, the recording/reproducing apparatus according to the present invention can rewrite only the fade information stored in a recording medium as will be described below:

When an operation is made at the operating panel 51 for updating the fade information or rewriting an existing fade information with a new one, the controller 50 will search a location where the new fade information is to be written.

More specifically, the controller 50 will have the optical pickup 20 read a fade information recorded in an optical dis, and search a location where the new fade information set at the operating panel 51 is to be written, through the data reproducing circuit 31, demultiplexer 32 and fade information extraction circuit 41.

After having found a writing location for the new fade information, the controller 50 will control the navigation pack generating circuit 14 to generate the new fade information set for rewriting the fade information on NV_PCK in each VOBU. The multiplexer 15 will supply the optical pickup 20 with a navigation pack including a rewritten fade information via the data recording circuit 16. The optical pickup 20 will record the navigation pack including the new fade information into the disc.

For no cross-fade processing of a screen on which a cross-fade processing has been done, for example, "NORMAL/CROSS" in the fade information is rewritten to "00", or on the contrary, it is rewritten to "10" for a cross-fade processing. Also, "SPEED" data is also rewritten for changing the cross-fade processing speed.

As having been described in the foregoing, the recording/reproducing apparatus according to the present invention can rewrite only the fade information to easily and positively change a position and speed for cross-fade processing without rewriting any video signal initially recorded in the disc. Namely, the recording/reproducing apparatus can provide or cancel a cross-fade processing without any special processing of an original video signal, through recording of a normal video signal and fade information into the disc.

Further, in addition to the cross-fade processing, the recording/reproducing apparatus can process a video signal for fade-in or -out based on the above-mentioned fade information. For example, the switch 34 in FIG. 3 may be turned off and the content of the image memory 35 be reset, for this purpose. If fade information "NORMAL/CROSS" is set to "01", "IN/OUT" is set to "0" or "1" and START TIME and SPEED are also available, fade-in or the like processing are possible.

For a fade-in processing, the controller 50 will set the value of the composition factor K to "0" until a fade-in processing start time, and gradually increase it up to "64" after the fade-in processing start time passes. Thereby, it is made possible to effect a fade-in processing in which an image currently not visible is allowed to appear little by little.

For a fade-out processing, the controller 50 will set the value of the composition factor K to "64" until a fade-out processing start time of fade-out, and gradually decrease it down to "0" after the fade-out processing start time passes. Thereby, it is made possible to effect a fade-out processing in which a fully visible image (100% output) is allowed to disappear little by little.

It should be noted that of course an audio signal can similarly processed for fade-in or -out.

Also the present invention is not limited to the aforementioned embodiment, but can be modified in various forms without departing from the scope and spirit as set forth in the claims.

In the foregoing, "START TIME" and "SPEED" are said to be main data in a fade information. However, a "processing time" for which a cross-fade processing is done may be included in place of the "SPEED" in the fade information. This variation is allowable because the START TIME and PROCESSING TIME include an information "SPEED" in practice.

What is claimed is:

1. A reproducing apparatus, comprising: means for reproducing a video or audio signal and fade information indicative of a change in output level of the video signal, recorded in a recording medium; and an output adjusting means responsive to said fade information for adjusting the output level of the video or audio signal supplied from the reproducing means;

wherein the output adjusting means comprises a storage means for preserving the integrity of a preceding video or audio signal from the reproducing means, and wherein the fade information includes time information representing a time when changing of the output level of the video or audio signal is to be started and speed information representing a speed at which the output level is to be changed.

2. The apparatus as set forth in claim 1, wherein the output adjusting means lowers, when the start time is nearly reached, the output level of a preceding image at a predetermined rate based on the speed information.

3. The apparatus as set forth in claim 1, wherein the output adjusting means delivers the video signal while adjusting the output level thereof based on the speed information when a start time is reached.

4. The apparatus as set forth in claim 3, wherein the speed information indicates a predetermined rate at which the output level is to be raised, and the output adjusting means delivers the video signal while raising the output level at the predetermined rate based on the speed information.

5. The apparatus as set forth in claim 3, wherein the speed information indicates a predetermined rate at which the output level is to be raised, and the output adjusting means does not adjust the video signal before the start time is reached, and when the start time is reached raises the output level of the video signal at the predetermined rate indicated by the speed information.

6. A reproducing apparatus, comprising: means for reproducing from a recording medium a video or audio signal and fade information indicative of a change in output level of the video or audio signal, the fade information including time information representing a time when changing the output level of the video or audio signal is to start and speed information representing a speed at which the output level is to change; and an output adjusting means for adjusting the output level of the video or audio signal supplied from the reproducing means based on the fade information, the output adjusting means comprising a storage means for preserving the integrity of a preceding video signal reproduced by the reproducing means just before a start time, a first level controlling means for delivering the video signal as it is from the reproducing means before the start time is reached, and when the start time is nearly reached, for lowering the output level of the preceding image at a predetermined rate based on the speed information, and a second level controlling means to raise the output level of a motion picture signal from a predetermined value at the predetermined rate; and image composing means for composing an output video or audio signal of video or audio signals supplied from the first and second level controlling means.

7. A reproducing apparatus, comprising: means for reproducing from a recording medium a video or audio signal and fade information indicative of a change in output level of the video or audio signal, the fade information including time information representing a time when changing the output level of the video or audio signal is to start and speed information representing a speed at which the output level is to change; and an output adjusting means for adjusting the output level of the video or audio signal supplied from the reproducing means based on the fade information, wherein the output adjusting means lowers the output level of a preceding video or audio signal when the start time is nearly reached.

8. A reproducing apparatus, comprising: means for reproducing from a recording medium a video or audio signal and fade information indicative of a change in output level of the video or audio signal, the fade information including time information representing a time when changing the output level of the video or audio signal is to start and speed information representing a speed at which the output level is to change; and an output adjusting means for adjusting the output level of the video or audio signal supplied from the reproducing means based on the fade information, wherein the output adjusting means raises the output level of a preceding video or audio signal when the start time is nearly reached.

9. A recording apparatus, comprising: controlling means for setting fade information indicative of a change in output level of a video or audio signal, the fade information including time information representing a time when the change in the output level of the video or audio signal is to start and speed information indicative of a rate at which the output level is to change; fade information generating means for producing the fade information set by the controlling means, including the start time and the speed information; recording means for recording onto a recording medium the produced fade information and the video or audio signal; and storage location detecting means for determining the location where the fade information is stored or determining a location where new fade information is to be written on the recording medium, wherein the recording means records the produced fade information at the storage location detected by the location detecting means.

10. The apparatus as set forth in claim 9, wherein the controlling means sets information on the speed at which the output level is to be lowered; and the fade information generating means produces fade information indicating the speed at which the output level is to be lowered.

11. The apparatus as set forth in claim 9, wherein the controlling means sets information on the speed at which the output level is to be raised; and the fade information generating means produces fade information indicating the speed at which the output level is to be raised.

12. A recording medium having recorded therein a video or audio signal and fade information indicative of a change in output level of the video or audio signal, the fade information including time information representing a time when changing of the output level of the video or audio signal is to be started, and speed information representing a speed at which the output level is to be changed.

* * * * *